United States Patent [19]
Glover

[11] Patent Number: 5,330,027
[45] Date of Patent: Jul. 19, 1994

[54] METHOD OF AND APPARATUS FOR CONTROLLING WHEEL SPIN

[75] Inventor: Douglas W. Glover, Worcestershire, England

[73] Assignee: Lucas Industries public limited company, Solihull, England

[21] Appl. No.: 815,016

[22] Filed: Dec. 27, 1991

[30] Foreign Application Priority Data

Jan. 4, 1991 [GB] United Kingdom ............. 9100165

[51] Int. Cl.⁵ .......................................... B60K 15/00
[52] U.S. Cl. ............................ 180/197; 364/426.03
[58] Field of Search ............. 180/197; 74/844, 856; 364/426.02, 426.03

[56] References Cited

U.S. PATENT DOCUMENTS

| | | | |
|---|---|---|---|
| 4,432,430 | 2/1984 | Lind et al. ........................ | 180/197 |
| 4,843,552 | 6/1989 | Inagaki ........................... | 180/197 X |
| 4,860,849 | 8/1989 | Andersson et al. ................ | 180/197 |
| 4,951,773 | 8/1990 | Poirier et al. .................... | 180/197 |
| 4,985,837 | 1/1991 | Togai et al. ...................... | 180/197 X |
| 5,018,595 | 5/1991 | Hara et al. ....................... | 180/197 |
| 5,025,882 | 6/1991 | Ghoneim et al. .................. | 180/197 |
| 5,038,883 | 8/1991 | Kushi et al. ...................... | 180/197 |
| 5,113,963 | 5/1992 | Sigl et al. ........................ | 180/197 |
| 5,154,151 | 10/1992 | Bradshaw et al. ................ | 180/197 X |
| 5,168,950 | 12/1992 | Krusche .......................... | 180/197 |

FOREIGN PATENT DOCUMENTS

| | | | |
|---|---|---|---|
| 18251 | 1/1984 | Japan ............................. | 180/197 |
| 151160 | 8/1985 | Japan ............................. | 180/197 |
| 2158270 | 11/1985 | United Kingdom .............. | 180/197 |

Primary Examiner—David M. Mitchell
Assistant Examiner—Gary C. Hoge
Attorney, Agent, or Firm—Jenner & Block

[57] ABSTRACT

A traction control system is provided for controlling wheel spin of a vehicle. The amount of wheel spin is determined for each driven wheel and compared with a threshold. When the threshold is exceeded, drive to the driven wheel is immediately reduced by a predetermined amount. Drive is restored as soon as the wheel spin is brought under control.

10 Claims, 2 Drawing Sheets

METHOD OF AND APPARATUS FOR CONTROLLING WHEEL SPIN

FIELD OF THE INVENTION

The present invention relates to a method of and an apparatus for controlling wheel spin.

BACKGROUND OF THE INVENTION

Wheeled vehicles depend upon the maintenance of an adequate frictional contact between the driven wheels of the vehicle and the ground. When the driving force at the driven wheels exceeds a value which is related to the weight acting on the driven wheels and the co-efficient of friction of the ground surface, the driven wheels slip with respect to the ground, thus exhibiting the phenomenon known as wheel spin. During normal operation of a vehicle on surfaces of relatively high co-efficient of friction, such as dry tarmac, wheel spin is not a problem. However, on surfaces of relatively poor co-efficient of friction, such as water logged tarmac, ice, and muddy surfaces, poor driving technique can give rise to wheel spin. When a wheel spins excessively, the loss of proper frictional contact with the ground allows the wheel to slip sideways and, in extreme cases, can result in spinning or excessive yawing of the vehicle i.e. lateral instability. Small amounts of wheel spin do not result in substantial lateral instability and may even be beneficial for maximizing acceleration of the vehicle or preventing damage to the vehicle transmission caused by careless or over-enthusiastic driving techniques. However, excessive amounts of wheel spin should be avoided and, for this purpose, so-called "traction control" systems have been developed.

A known type of traction control system reduces the output demand of an internal combustion engine as a predetermined function of the amount of wheel spin above a predetermined threshold value. For instance, a proportional/integral/differential control function of wheel spin is used to reduce the engine output demand. However, in some circumstances, such a control function does not allow the energy stored in the vehicle engine to be reduced sufficiently quickly, so that loss of vehicle stability can occur.

SUMMARY OF THE INVENTION

According to a first aspect of the invention, there is provided an apparatus for controlling wheel spin of at least one driven wheel of a vehicle, comprising means for detecting wheel spin and spin control means for controlling spin by reducing drive to the at least one driven wheel by a predetermined amount upon detection of wheel spin exceeding a predetermined threshold.

Preferably, the spin control means is arranged to be disabled when wheel spin falls to less than a predetermined threshold value, which may be the same as or different from the predetermined threshold.

Preferably the spin control means is arranged to reduce the drive to a predetermined proportion of the drive before the detection of wheel spin exceeding the threshold, for example to 50% of the previous drive. In order to control a vehicle driven by an internal combustion engine, it is possible to reduce a throttle demand or to alter ignition timing in order to reduce drive. However, it is preferable to reduce fueling of the engine by cutting off the supply of fuel for a predetermined pattern of cylinder fire periods. Further, these techniques for reducing drive may be combined.

Preferably the spin control means is arranged to reduce drive in accordance with a predetermined function of wheel spin including an integral term having an initial value corresponding to a predetermined drive reduction.

According to a second aspect of the invention, there is provided a method of controlling wheel spin of at least one driven wheel of a vehicle, comprising detecting wheel spin and reducing drive to the at least one driven wheel by a predetermined amount upon detecting wheel spin greater than a predetermined threshold.

By providing an essentially instantaneous or step reduction in drive, it is possible to respond rapidly to the detection of excessive wheel spin. Thus, the traction control response time can be substantially improved with a consequent improvement in vehicle stability. By cutting off the fueling for a predetermined repeating sequence of cylinder events, engine output can be quickly reduced so as to reduce or eliminate wheel spin with a very rapid response time. Once wheel spin has been sufficiently controlled, the normal engine cylinder firing pattern may be restored.

BRIEF DESCRIPTION OF THE DRAWINGS

The invention will be further described, by way of example, with reference to the accompanying drawings, in which.

DETAILED DESCRIPTION

Figure 1:
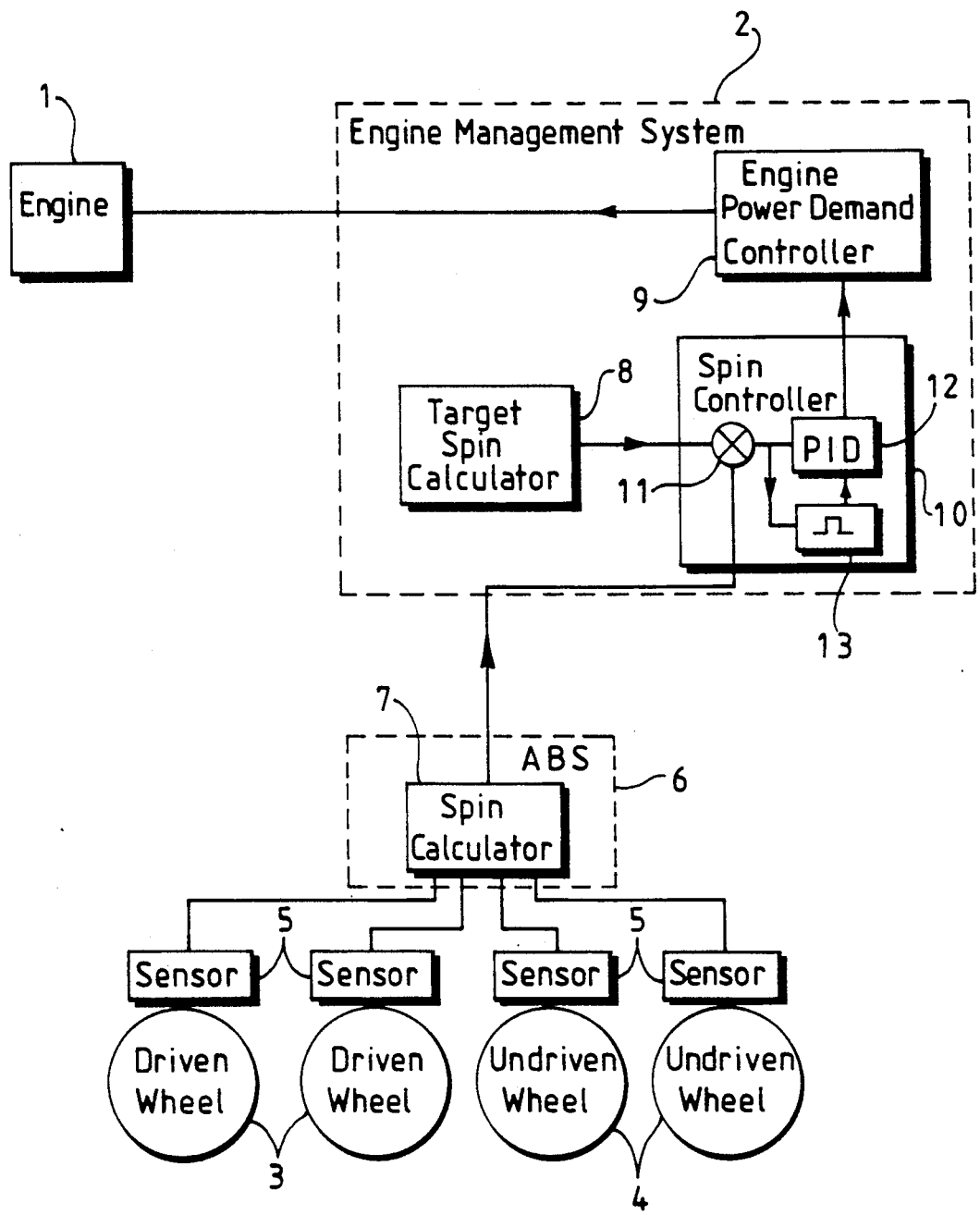
FIG. 1 is a block schematic diagram of a wheel spin controller constituting an embodiment of the invention.

A vehicle is driven by an internal combustion engine 1 whose operation is controlled by an engine management system 2. The vehicle has a pair of driven wheels 3 connected by a transmission (not shown) to the engine 1. The vehicle also has a pair of undriven wheels 4.

The wheels 3 and 4 are provided with respective sensors 5, such as variable reluctance transducers co-operating with toothed wheels, which provide signals representing the speeds of the wheels. The wheel speed signals are supplied to an anti-lock brake system 6 which includes a spin calculator 7 for providing an output signal representing the amount of wheel spin detected. For instance, the spin calculator 7 compares the speeds of the driven wheels 3 with the speeds of the undriven wheels 4 in order to detect excessive driven wheel speed and supplies a signal corresponding to the amount of wheel spin to the engine management system 2.

In the case of a vehicle which does not have an anti-lock brake system, the spin calculator 7 and the sensors 5 may be provided in order to permit traction control or wheel spin control. Also, wheel spin may be determined in other ways, for instance by comparing the speed of each wheel with an average speed of all wheels or by comparing wheel speed with vehicle speed determined by a speed over ground sensor or the like. Wheel spin control may also be provided for all-wheel drive vehicles, for instance using one of the above mentioned alternative wheel spin detection techniques in place of the comparison with undriven wheel speed illustrated in the drawings.

The engine management system 2 includes a target spin calculator 8 which supplies a target spin value to a spin controller 10. The spin controller 10 comprises a subtracter 11 whose summing input receives the spin signal from the spin calculator 7 and whose subtracting input receives the target spin value. The output of the subtracter 11 is supplied to an input of a proportional-/integral/differential (PID) controller 12, whose output is connected to an engine power demand controller 9.

The spin controller 10 further comprises a setting circuit 13 having an input connected to the output of the subtracter 11 and an output connected to a setting input of the PID controller 12. The circuit 13 is arranged to produce a pulse when the output of the subtracter 11 rises above zero, which pulse causes the controller 12 to preset the integral term to an initial value corresponding to a predetermined reduction in engine output demand. Alternatively, the circuit 13 may be arranged to be actuated when the output of the subtracter 11 falls to zero with the output of the spin controller 10 being inhibited until the output of the subtracter 11 rises above zero when a subsequent excessive wheel spin event is detected. Thus, the output of the engine power demand controller 9 may be represented as:

$$fueling = normal\ fueling - (\Delta P + \Delta I + \Delta D)$$

where the integrator is preloaded with a value, dependent on the integrator gain, which gives half the normal fueling upon detection of excessive wheel spin.

During normal operation in the absence of excessive wheel spin, the spin signal supplied by the spin calculator 7 to the spin controller 10 is less than the target value supplied by the calculator 8. In these circumstances, the spin controller 10 is arranged not to intervene in the operation of the remainder of the engine management system.

Figure 2:
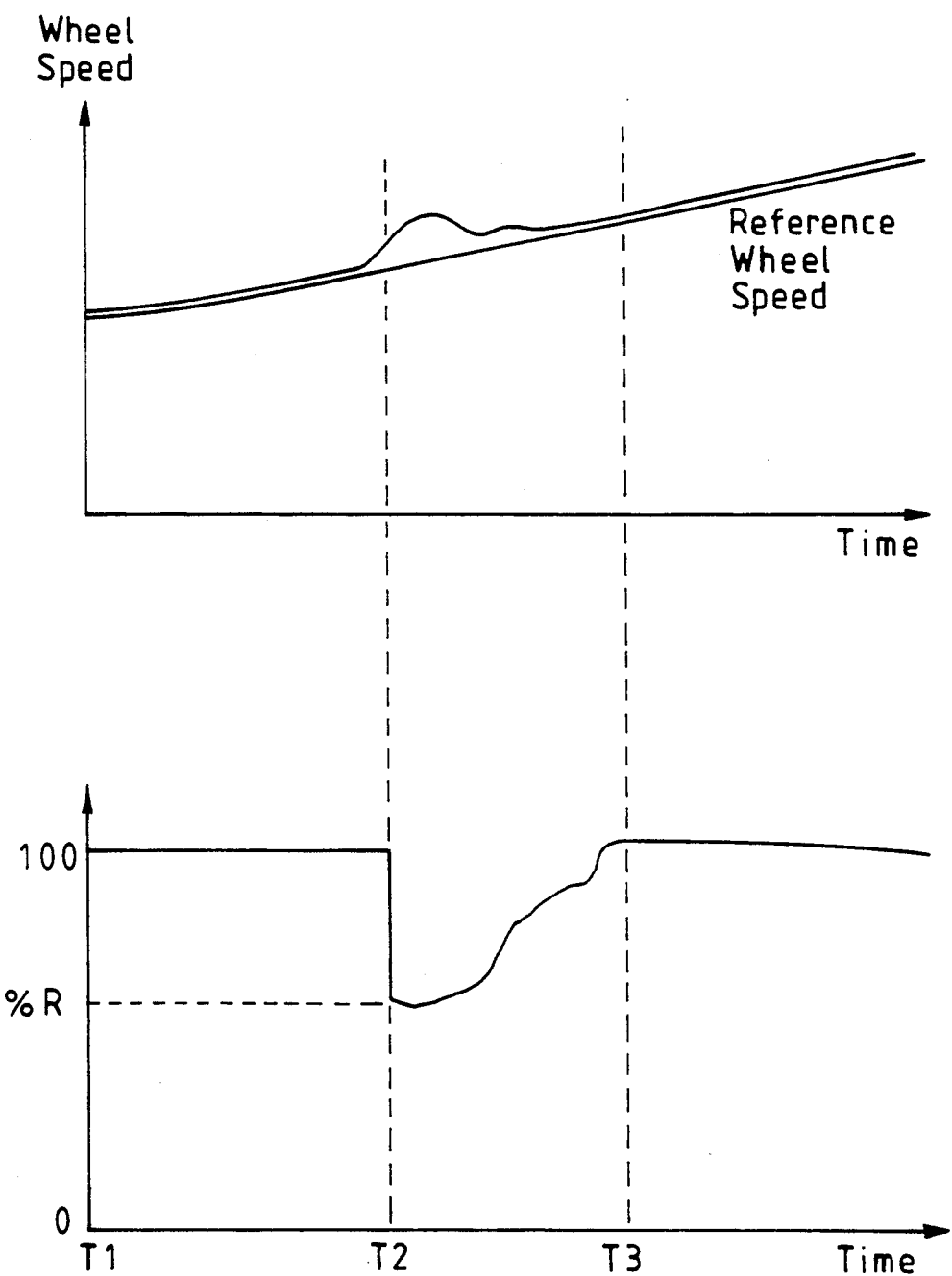
FIG. 2 shows graphs of wheel speed and percentage of output demand against a common time axis.

This is illustrated in FIG. 2 for the time interval from T1 to T2. In the lower graph, the output demand of the engine is not reduced and is thus represented by a horizontal curve at the 100% level. The upper graph compares the speed of one of the driven wheels 3 with a reference wheel speed as determined by the spin calculator 7 and the difference between these speeds is less than the target spin value in the period T1 to T2.

Immediately before time T2, the speed of the driven wheel increases substantially such that the difference between this speed and the reference wheel speed at the time T2 exceeds the target spin value. The resulting output of the subtracter 11 causes the setting circuit 13 to preset the integral term of the PID controller 12 to a value which corresponds to a reduction in output drive from 100% to R% as shown in FIG. 2. In response to this predetermined step reduction in output demand, the engine power demand controller 9 cuts off the supply of fuel in accordance with a predetermined pattern or sequence of cylinder events so as to reduce the engine output very rapidly. For instance, the strategies disclosed in Published European Patent Specification No. 0 443 785 may be used in order to reduce the engine output to a predetermined percentage of the demanded value, for example 50%. A throttle demand signal and-/or ignition timing may also be altered as part of the strategy for controlling wheel spin.

During the time interval T2 to T3, the PID controller 12 controls the reduction in engine output demand in accordance with the predetermined proportional/integral/differential function of the difference between the wheel spin signal and the target spin value supplied to the subtracter 11 so that, as shown in the upper graph of FIG. 2, the wheel spin is brought under control and reduced such that it becomes less than the target spin value at the time T3. At this time, the spin controller 10 ceases to supply an output demand reduction signal to the engine power demand controller 9 and the normal pattern of engine cylinder fueling is restored.

It is thus possible to provide a traction control system which is capable of providing a rapid response to the detection of excessive wheel spin. By providing an instantaneous or step reduction in engine output demand, especially when cutting fueling to the engine as described hereinbefore, wheel spin can be rapidly eliminated so as to prevent or reduce greatly any tendency for lateral instability of a vehicle.

I claim:

1. An apparatus for reducing wheel spin of at least one driven wheel of a vehicle, said apparatus comprising detecting means for detecting wheel spin and spin control means responsive to said detecting means for controlling spin by reducing drive to the at least one driven wheel upon detection by said detecting means of wheel spin exceeding a predetermined threshold, said spin control means being arranged to reduce the drive in accordance with a predetermined function of wheel spin, said predetermined function having a first term which is proportional to wheel spin and a second term which is an integral function relative to the time of wheel spin, said integral function having an initial value when said detecting means detects wheel spin exceeding a predetermined threshold, said initial value corresponding to a predetermined drive reduction.

2. An apparatus as claimed in claim 1, in which said spin control means is disabled when wheel spin falls to less than a predetermined threshold value.

3. An apparatus as claimed in claim 1, in which said spin control means is arranged to reduce the drive to a predetermined proportion of a drive before the detection of wheel spin exceeding the predetermined threshold.

4. An apparatus as claimed in claim 3, in which the predetermined proportion is 50%.

5. An apparatus as claimed in claim 1, for a vehicle driven by an internal combustion engine, in which said spin control means comprises means for cutting off supply of fuel for a predetermined pattern of cylinder fire periods of the engine.

6. A method of controlling wheel spin of at least one driven wheel of a vehicle, said method comprising the steps of detecting wheel spin and reducing drive to the at least one driven wheel upon detecting wheel spin greater than a predetermined threshold, said drive reducing step comprising reducing the drive in accordance with a predetermined function of wheel spin, said predetermined function having a first term which is proportional to a wheel spin and a second term which is an integral function relative to the time of wheel spin, said integral function having an initial value when wheel spin exceeding said predetermined threshold is detected, said initial value corresponding to a predetermined drive reduction.

7. A method as claimed in claim 6, comprising the further step of restoring the drive to the at least one driven wheel when wheel spin falls to less than a predetermined threshold value.

8. A method as claimed in claim 6, in which said drive reducing step comprises reducing the drive to a predetermined proportion of a drive before the detection of wheel spin exceeding the predetermined threshold.

9. A method as claimed in claim 8, in which the predetermined proportion is 50%.

10. A method as claimed in claim 6 for a vehicle driven by an internal combustion engine, in which said drive reducing step comprises cutting off supply of fuel for a predetermined pattern of cylinder fire periods of the engine.

* * * * *